No. 816,763. PATENTED APR. 3, 1906.
C. H. TRASK.
MACHINE FOR MAKING HAY FROM CORN AND OTHER STALKS.
APPLICATION FILED JULY 25, 1902.

4 SHEETS—SHEET 4.

WITNESSES:
Harold W. Davie
Saul Sippustein

INVENTOR:
Chas. H. Trask
by his attys
Clarke & Raymond

UNITED STATES PATENT OFFICE.

CHARLES H. TRASK, OF LYNN, MASSACHUSETTS.

MACHINE FOR MAKING HAY FROM CORN AND OTHER STALKS.

No. 816,763.  Specification of Letters Patent.  Patented April 3, 1906.

Application filed July 25, 1902. Serial No. 116,954.

*To all whom it may concern:*

Be it known that I, CHARLES H. TRASK, a citizen of the United States, and a resident of Lynn, in the county of Essex and State of Massachusetts, have invented a new and useful Improvement in Machines for Making Hay from Cornstalks, of which the following is a full, clear, and exact description, reference being had to the accompanying drawings, forming a part of this specification, in explaining its nature.

The invention comprises means for making edible product for horses, cattle, and other animals which resembles hay and is useful as hay and which is made from corn-stalks cut or slit into thin lengths which somewhat resemble spears of hay or straw.

I have represented my invention as embodied in a machine adapted to so treat dried cornstalks, as I have found that such stalks contain nutritious properties only slightly less in value than hay.

The machine, broadly speaking, comprises multiple means for feeding a number of stalks in separated relation from each other at the same time, for flattening or compressing the stalks as they are fed, for slitting the stalks into thin lengths or strands, and for feeding the lengths or stands from the slitting mechanism, and for cutting them as then assembled into lengths.

The invention further comprises means for the various adjustment of its elements to each other, to which reference will hereinafter be made.

I will now describe the invention in conjunction with the drawings forming a part of this specification, wherein—

Figure 1:
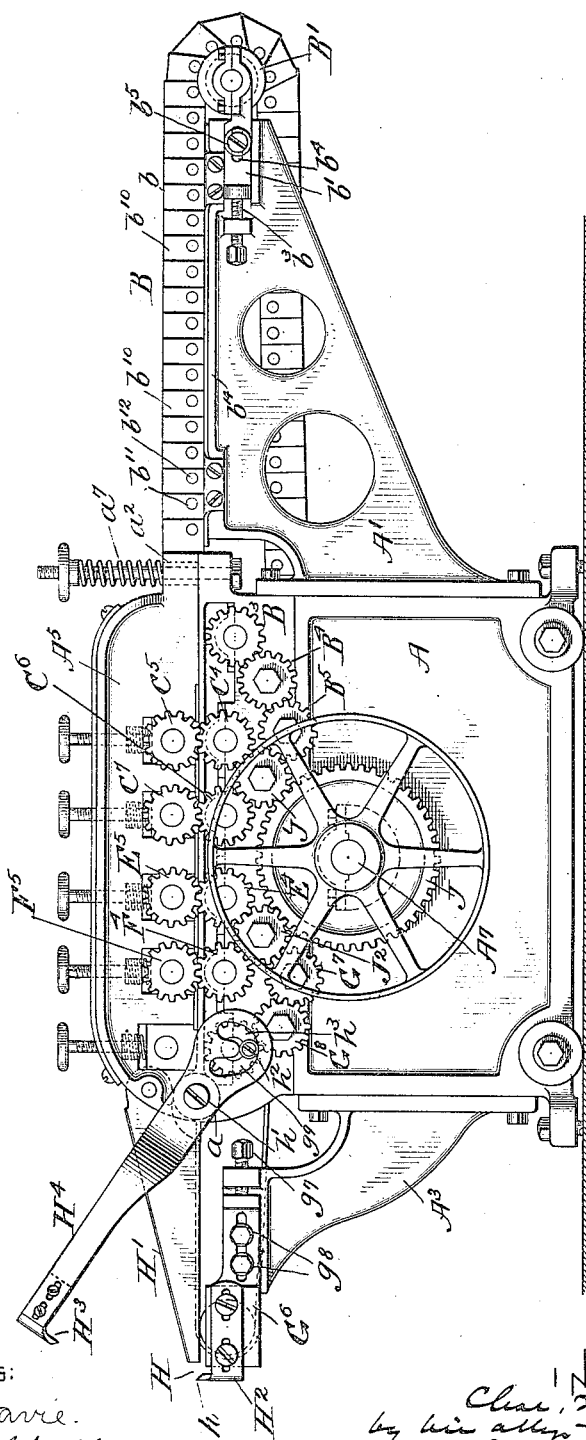
Figure 2:
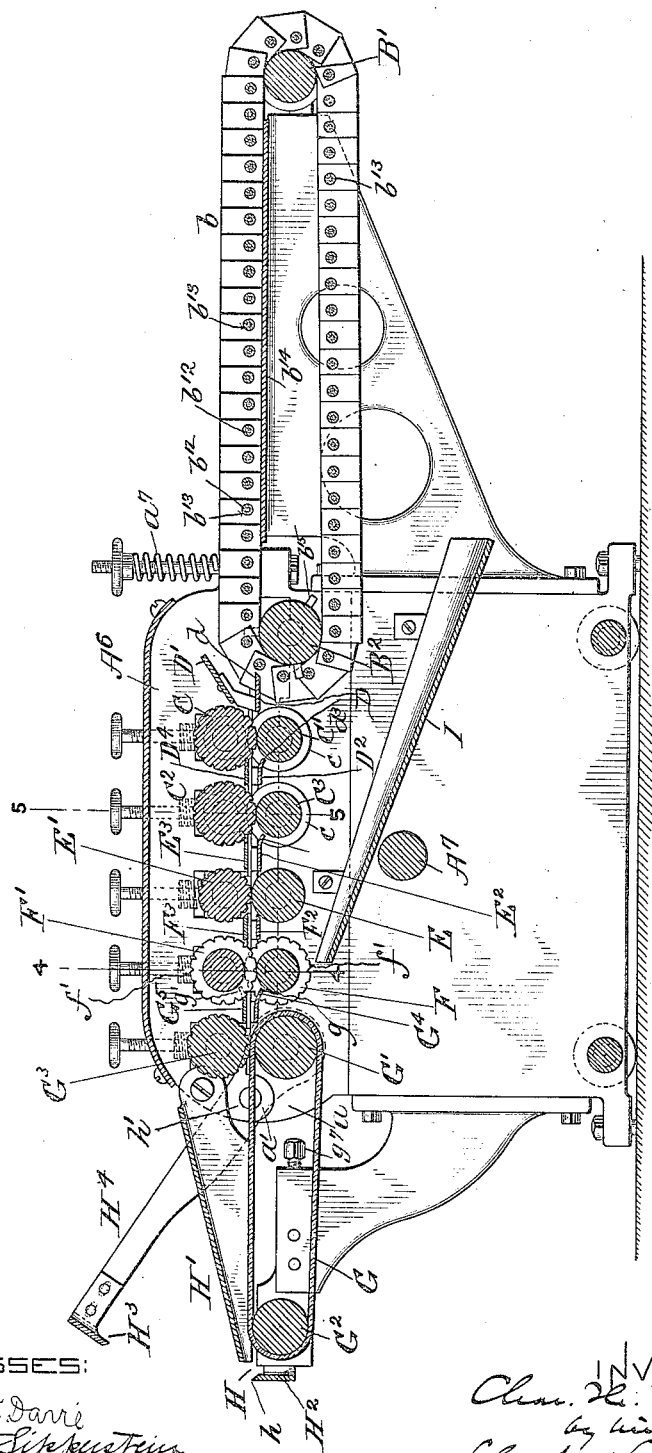
Figure 3:
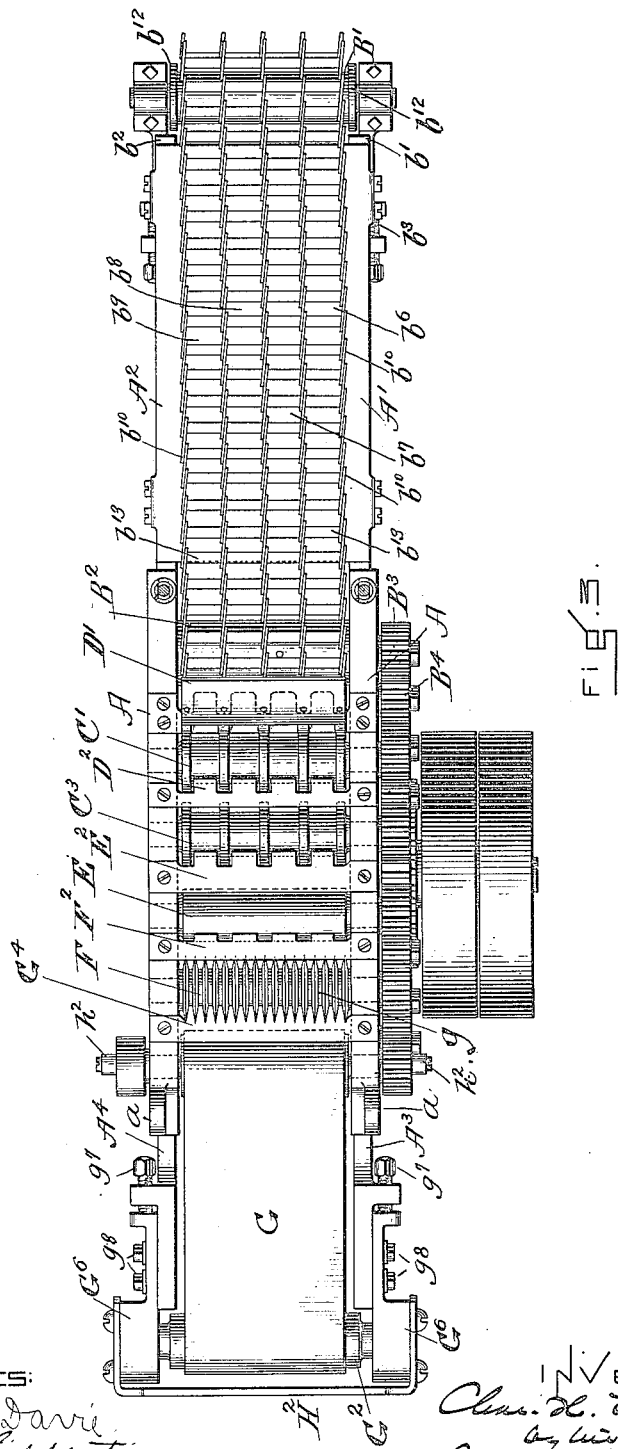
Figure 4:
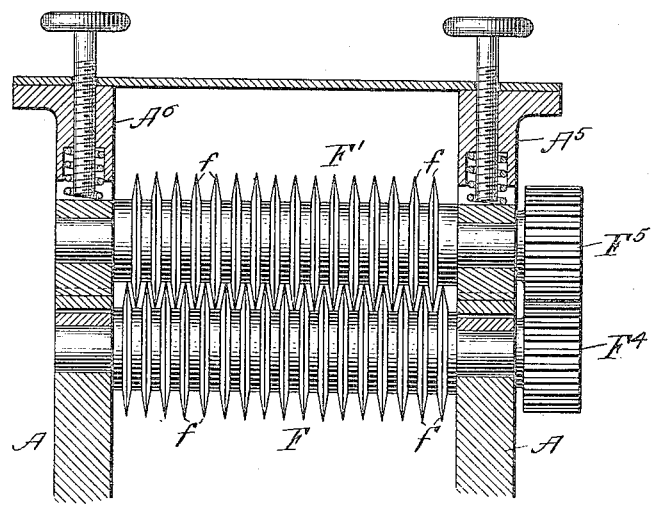
Figure 5:
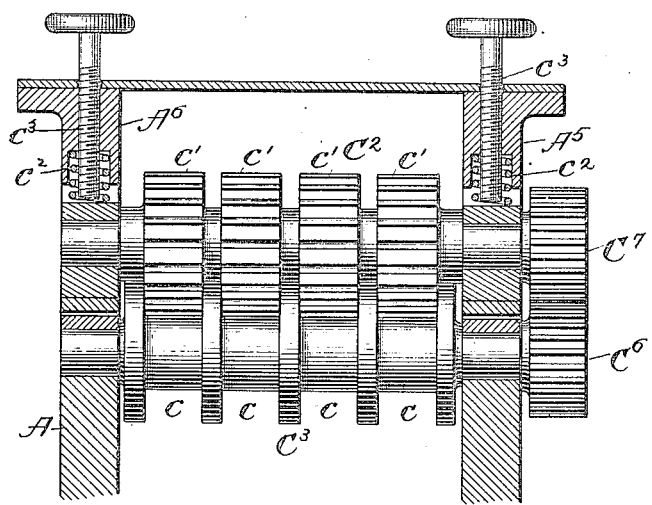

Figure 1 is a view in side elevation of a machine having the features of my invention. Fig. 2 is a view in vertical longitudinal section thereof. Fig. 3 is a view in plan, the supports of the upper rolls being removed. Fig. 4 is a view, enlarged, in vertical cross-section upon the dotted line 4 4 of Fig. 2. Fig. 5 is a view, enlarged, in vertical cross-section upon the dotted line 5 5 of Fig. 2.

The machine has a frame comprising the main section A, the front end brackets $A'$ $A^2$, the rear end brackets $A^3$ $A^4$, and the yielding roll-supports $A^5$ $A^6$. The brackets A $A'$ support the stalk-feeding belt, the brackets $A^3$ $A^4$ means for delivering the strands from the machine, and the supports $A^5$ $A^6$ the upper rolls of feed flattening and slitting devices to be described.

The primary means for feeding a number of stalks in separated relation as a whole is lettered B. It comprises any desired number of endless belts or chains $b$ of peculiar construction, which pass around the outer roll $B'$, mounted at the outer ends of the brackets A $A'$ and the driven roll $B^2$, mounted in the main frame A and suitably driven from the main shaft $A^7$ by means of gearing, to be described. The journal-bearings of the driving-roll $b^2$ are stationary. The driven roll $B'$ is mounted upon slides $b'$ and $b^2$, respectively, which are supported at the outer ends of the brackets $A'$ $A^2$ and are horizontally movable thereon to adjust the position of the roll $B'$ with respect to the roll $B^2$, and consequently the tension of the chains $b$ of the feeding mechanism, by means of adjusting-screws $b^3$ $b^3$, mounted on their respective brackets $A'$ $A^2$, screwing in a nut thereon and bearing against the end of the slide. Each slide has a horizontal slot $b^4$, through which a locking-screw $b^5$, fastening it to its bracket, extends. The rolls $B'$ $B^2$ have flanges $b^{12}$ upon their outer ends to lap upon the outer chains of the group of chains employed to maintain them in position on the rolls.

In the drawings I have represented the feeding device as having five chains and as forming four individual feeding-ways; but the feeding device may have any number of chains for forming as many feedways as it may be desirable to use. Each of the chains is lettered B; but the feedways are lettered $b^6$, $b^7$, $b^8$, and $b^9$, respectively. The feedways are of a width and depth to receive a corn or other stalk. The depth is obtained from the peculiar nature of the chains $b$, each chain being made of a number of links $b^{10}$, of thin sheet metal, practically square in form and arranged to overlap one upon the other and to be joined together at their lower corners by pivots or pivot-rods $b^{11}$, which permit of the turning of the links upon each other as the chain bends to the rolls, and yet provides when the chain is straight a continuous wall, thus securing a feedway which is deep and open upon its top. Where the machine has a number of feedways, I prefer to use for the pivots connecting the links pivot-rods common to all the chains. These pivot-rods pass through the holes in the links, are headed at their outer ends, and the links between the outer links are separated from each other by short sleeves $b^{13}$ of the width of the feedways, mounted upon the pivot-rods between the links. This affords a very simple, economical, and strong construction of feeding device. The pivots or the sleeves thereon form the bottoms of the feedways. To hold the feeding belt or chain from sagging, I have arranged that the feeding portion thereof shall have immediately beneath it a stationary table $b^{14}$, over which it runs and by which it is supported. (See Fig. 2.) This feeding device, it will be seen, is, in effect, an endless traveler of continuous individual feedways, each of which is adapted to receive independent stalks in continuous successive order and to feed them to the feeding-rolls.

While the driving-roll $B^2$ may not be positively connected with the traveling feeding device to operate it, yet I prefer that it should be, and I have therefore arranged upon the roll teeth or fingers $b^{15}$, which are adapted to engage the pivot-rods or the sleeves upon them as they pass over the roll, the pivots and their sleeves being separated sufficiently to permit the teeth or fingers of the roll $B^2$ to engage them and the sleeves acting as anti-friction-rolls between the teeth or fingers and the pivots.

The feeding device presents the individual stalks to the feeding-rolls. Two pairs of these rolls are shown. They are upon a line with each other and are alike. The first pair is lettered C C', and the second pair $C^2 C^3$. The lower roll of each pair has a fixed bearing in the frame A, and each of said rolls has a deep groove or recess $c$ for each feedway of the feeding device in line therewith and with each other. The upper rolls C $C^2$ are mounted in boxes on the yielding support $A^5$, and each of these rolls has an annular section $c'$ for each of the grooves or recesses $c$ of their companion rolls C' $C^3$, respectively, and each is of a diameter and size to enter said grooves or recesses. The surfaces of these sections of the rolls are made frictional by being provided with any desired frictional formation. A preferred method is by making the periphery of the rolls ribbed or corrugated, as may be seen in Fig. 5. The feed-rolls thus formed act to prevent the stalks from crossing each other as they are being fed, and may also to some extent act as a stalk-flattening means. The boxes upon which the rolls are mounted are made yielding in the support $A^5$. (See Fig. 5, where a coiled spring $c^2$ is represented over each box and the tension of which is adapted to be varied by an adjusting-screw $c^3$.) The upper rolls of the machine yield automatically and accommodate themselves to varying thicknesses of the various stalks which they may be feeding.

To guide the stalks from the feedways of the feeding-belt to the rolls, I have employed a narrow table D, which bridges the space between the first of the lower rolls and the bottom of each feedway, the table having tongues $b$, (see Fig. 2,) which extend between the sides of the feedways. There is also employed over this bed-plate the plate D', which is inclined from its outer edge downwardly and inwardly and tends to deflect between the rolls any stalks which may be inclined to ride upward from the feedway. There is also arranged between the two pairs of feed-rolls C C' and $C^2 C^3$ the bed $D^2$, over which the stalks pass and which has clearing-fingers $d^3$, entering grooves or recesses on the roll C to lift from it and free from it stalks which might otherwise adhere to the roll.

$D^4$ is a cover-plate between the two rolls C $C^2$ to prevent the rising of the ends of the stalks as they pass from one pair of rolls to the other.

Not only do the rolls C $C^2$ have a yielding relation with respect to the rolls C' $C^3$, because of the spring-like boxes, but they may also be provided with such tension as the yielding support $A^5$ may itself possess, because of its leverage and because of the spring-pressure which is exerted against it.

The supports $A^5 A^6$ are pivoted to the end $a$ of the main frame A at their ends $a'$. Their other ends $a^2$ have tension-springs $a^7$ to bear against them, the tension of which may be varied. Each of these springs is represented as mounted upon a headed screw-rod, which extends forward through a part of the main frame and a part of the movable support and which is threaded to receive an adjusting-nut which bears upon the spring and is used to hold it and vary its tension. The supports are thus in the nature of spring-depressed levers and the nearer the rolls are to the pivoted end of the support the greater the stress with which they are held against their coöperating rolls and the smaller their range of movement with respect to them.

Beyond the feed-rolls $C^2 C^3$ are the flattening-rolls E E'. These rolls serve also as feed-rolls. The roll E has a continuous smooth surface, and the roll E', which is carried by the supports $A^5 A^6$, has a roughened or corrugated surface. The office of these rolls is to feed the stalks and to flatten them. Between them and the feed-rolls $C^2 C^3$ is a bed $E^2$, which is like the bed $D^2$, and has clearing-fingers $E^2$ to enter the recesses of the roll $C^3$ to remove the stalks therefrom, and above the bed is the cover-plate $E^3$. The roll E' is mounted in the supports $A^5 A^6$ in a manner similar to the rolls C $C^2$.

Next the flattening-rolls E E' are the slitting-rolls F F'. Each of these rolls has a relatively large number of cylindrical cutters $f$, arranged closely together and having a tapering cutting edge provided with cross-notches $f'$. (See Fig. 2.) The rolls are so arranged that the cutters lap by each other and the cutters serve to slit or cut the stalks into narrow thin lengths, much resembling strands of hay in size and appearance. The upper cutting-roll F' is mounted upon the yielding supports $A^5$ $A^6$ and preferably has thereon a vertical adjustment to compensate for wear. Between the cutting-rolls and the flattening-rolls E E' is the bed $F^2$ and its cover $F^3$ for guiding the flattened stalk from the flattening-rolls to the cutters. The severed strands pass over the cutters to a drawing and feeding device, which comprises a belt G, passing about the rolls G' $G^2$, and a roll $G^3$, which is mounted over the roll G', and between which and the belt the strands are drawn and fed. The roll G' is positively driven. Between the rolls G' $G^3$ and the cutters F F' is the bed $G^4$ and the cover-plate $G^5$. Each of these plates has clearing-fingers $g$ $g'$ to enter the recesses in the cutters between the cutting-blades to free the severed strands from the cutters and cutting-rolls. The strands are fed by the belt G through the outlet H, formed by the belt and the assembling cover H', and over the cutting edge $h$ of a stationary cutter $H^2$, and a drop cutting-blade $H^3$, at the outer ends of the arms $H^4$, is caused to be oscillated past the cutting edge $h$ to sever the assembled strands into lengths of any desired extent.

The arms $H^4$, carrying the cutter $H^3$, are pivoted at $h'$ to the main frame and are oscillated by means of the rotating cam-pins $h^2$ and cam-grooves $h^3$ at the inner end of the arms. (See Fig. 1.)

The belt-roll $G^2$ is mounted upon slides $G^6$, (see Fig. 1,) which is horizontally adjustable upon the bracket $A^3$ by means of the set-screws $g^7$ to vary the tension of the feeding-belt, and the slides are adapted to be locked by screws $g^8$ in adjusted position. The lower stationary cutter $H^2$ and the upper cutter $H^3$ are also adjustable lengthwise their supports by means of slots and clamping-screws, or in any other desired way, each cutter having arms extending backward from its ends in which the slots are arranged and which afford means whereby the cutters are attached to their holders.

Beneath the feeding and cutter rolls there is arranged an inclined trough I, by which fluid and other refuse from the stalks passing through the machine may be delivered in front of the main frame.

I have represented the various rolls as geared from the gear J on the main shaft, as follows: The chain-feeding roll $B^2$ by the gears $B^3$, $B^4$, $B^5$, and J'; the feed-rolls C C' by the gear J' and gears $C^4$ $C^5$; the feed-rolls $C^2$ $C^3$ by the gear J' and the gears $C^6$ $C^7$; the flattening-rolls E E' by the gear $J^2$ and the gears $E^4$ $E^5$; the cutter-rolls F F' by the gear $J^2$ and the gears $F^4$ $F^5$; the belt-driving roll G' by the gear $J^2$ and the gears $G^7$, $G^8$, $G^9$, the latter gear and a collar upon the opposite end of the roll G' carry the cam-pins $h^2$ for oscillating the cutter-arms $H^4$. The gears $C^5$ $C^7$ $E^5$ $F^5$ are mounted on the support $A^5$ $A^6$ and are movable with them, and consequently have a slight movement with respect to their companion gears without, however, losing engagement therewith.

The operation of the machine is as follows: The stalks are fed into the various feedways of the multiple feeding device in regular order and preferably so as not to overlap, and they are fed by the feeding device to the feed-rolls which hold them in line as they are fed and in separated relation and which also act to somewhat flatten them. They are further flattened by the flattening-rolls, which also serve as feed-rolls and are then slit by the cutting-rolls into narrow strands which are drawn and fed by the drawing-rolls and feeding-belt beyond the cutters assembled upon the feeding-belt by the assembling-cover H', and pass by it in their assembled relation over the cutter H, where they are cut into such lengths as may be desired by the oscillation of the cutter $H^3$.

I would say that it is not necessary that the strands be cut into lengths and that the assembling-cover and cutters may be dispensed with, as may also the rear apron and feeding-rolls. I would further add that the mechanism may be varied by the addition of or subtraction of feeding and flattening rolls, if so desired.

It will be seen that the organization of the machine is such that the stalks are fed to the cutters by means which prevent their crossing each other and that thus each cornstalk is independently presented to the cutters, which shred it or sever it into strands. It will further be seen that the multiple feeding-belt is supported in a horizontal position by a table, so that the feedways are always straight or level while feeding. It will further be noticed that the machine is so organized as to vary the pressures of the various rolls upon the material and also so as to yield to variations in thickness of the material; also, that each pair of rolls has independent adjustment, so that they may be independently set to any desired pressure and may then collectively be set by means of the pressure common to them all, though varying in intensity to suit the conditions of use of each set.

Having thus fully described my invention, I claim and desire to secure by Letters Patent of the United States—

1. In a machine of the character specified, a frame, and in combination therewith a series of devices for feeding a plurality of stalks to a series of slitting-cutters and for flattening the same while they are being fed, means in front of said cutters for retaining said stalks against lateral displacement and for guiding the same to feed lengthwise thereto, and said series of slitting-cutters arranged to cut each of said flattened stalks lengthwise into long, narrow strands.

2. In a machine of the character specified, a frame and in combination therewith means for feeding and flattening a plurality of stalks, means in front of a series of slitting-cutters for retaining said stalks against lateral displacement and for guiding each of said stalks to feed lengthwise thereto, said series of slitting-cutters disposed to cut each flattened stalk lengthwise into long, narrow strands, and means beyond said cutters for receiving the cut strands and for drawing the same from the cutters.

3. In a machine of the character specified, a frame and in combination therewith a stalk-feeding belt, stalk feeding, flattening, individualizing and guiding mechanism consisting of two driven rolls one of which has a series of box-grooves and the other of which has a corresponding series of sections to enter said grooves, feeding and flattening rolls disposed beyond the said mechanism and between the same and a series of slitting-cutters, and said slitting-cutters so placed as to cut the flattened stalk into long, narrow strands.

4. In a machine of the character specified, a frame and in combination therewith a series of stalk feeding, guiding and flattening devices, which are in line with one another and which act also to separate and guide the stalks to feed lengthwise to a series of slitting-cutters, feedways interposed between said devices for facilitating the guidance of the stalks, and said series of slitting-cutters to which the flattened stalks are guided and fed, said cutters being placed relatively near together so as to cut each flattened stalk into long, narrow strands.

5. In a machine of the character specified, the combination with a stalk-traveling belt having a plurality of walled receiving-ways for independently receiving and individualizing the stalks, of a series of stalk feeding and flattening devices which are in line with the respective ways of said traveling belt, and which serve also to guide the stalk along its entire length that it may be fed longitudinally upon the cutters and a series of cutters adapted to cut the flattened stalks lengthwise, said cutters being placed relatively near together that each flattened stalk may be cut lengthwise into long strands.

6. In a machine of the character specified, a frame and in combination therewith a stalk-feeding belt comprising two or more chains, composed of flat links riveted to each other near their inner edge to provide a walled recess or way open at its top for receiving and individualizing stalks delivered thereto and for feeding the same, a series of slitting-cutters, and a series of devices interposed between said stalk-feeding belt and said cutters for receiving the stalks from said belt and for guiding, flattening and feeding the same lengthwise upon said cutters.

7. In a machine of the character specified, a frame and in combination therewith a multiple stalk receiving and feeding device having a series of narrow, stalk-receiving ways separated by walls and adapted to feed the stalks endwise, a series of feeding and flattening devices beyond said device, feedways between said feeding and flattening devices and said device, which enter into coöperation therewith, forming walled or box-like ways leading from the stalk-receiving ways of the device aforesaid to a series of slitting-cutters, and said series of slitting-cutters in line with said ways.

8. In a machine of the character specified, a frame and in combination therewith, a traveling feed-belt having a series of stalk-receiving ways, means for adjusting said belt, means for keeping the same from sagging, a series of feeding and flattening devices in front of said belt adapted also to individualize and guide said stalks in a direction in continuation of the ways thereof, and a series of cutters disposed to cut the flattened stalks lengthwise into long, narrow strands.

9. In a machine of the character specified, a frame and in combination therewith a multiple stalk receiving and feeding device having a series of stalk-receiving ways separated by walls and adapted to feed the stalks lengthwise, stalk-receiving rolls in line with said stalk-receiving ways, means for guiding the stalks from said ways to the rolls and preventing them from crossing one another in the rolls, stalk-flattening means and a series of cutters adapted to cut the flattened stalks lengthwise, said cutters being placed relatively near together that each flattened stalk may be cut lengthwise into long strands.

10. In a machine of the character specified, a frame and in combination therewith one or more pairs of stalk-receiving rolls having a series of independent stalk-receiving ways, a pair of stalk-flattening rolls and a pair of stalk-cutting rolls beyond said flattening-rolls, the lower roll of each of said pairs being stationarily held and the upper roll of each of said pairs being independently adjustable upon its support, said support and means for providing it with a yielding variable pressure.

11. In a machine of the character specified, a frame and in combination therewith a series of stalk feeding and flattening devices, a series of slitting-cutters to which the flattened stalks are fed, which cutters are placed relatively near together so as to cut each flattened stalk into strands, means for individualizing and guiding the stalks to feed lengthwise upon said cutters, and means for receiving the strands from said cutters and for carrying them from the same.

12. In a machine of the character specified, a frame and in combination therewith a series of stalk feeding and flattening devices, a series of slitting-cutters to which the flattened stalks are fed, which cutters are placed relatively near together so as to cut each flattened stalk into strands, means in front of said cutters for retaining the stalks against lateral displacement and for guiding each of the same to feed lengthwise upon said cutters, and a strand receiving, holding and carrying means beyond said cutters adapted to draw the cut strands from said cutters and to feed the same.

13. In a machine of the character specified, a frame and in combination therewith a series of stalk feeding and flattening devices, means in front of a series of slitting-cutters for retaining the stalks against lateral displacement and for guiding each of the same to feed lengthwise upon said cutters, said series of slitting-cutters, so placed as to cut the flattened stalks lengthwise into long, narrow strands, a strand holding and carrying means beyond said cutters adapted to draw the cut strands from said cutters and to feed the same, and a knife adapted to cut the strands crosswise.

14. In a machine of the character specified, a frame and in combination therewith a series of slitting-cutters, strand-feeding rolls beyond said cutters, a varying feed-belt passing around one of said rolls, and a strand-cutter.

15. In a machine of the character specified a frame and in combination therewith stalk shredding or slitting cutters, strand-feeding rolls beyond said cutters and strand receiving and carrying means beyond said rolls, a strand-assembling cover and a strand-cutter.

16. In a machine of the character specified, a frame and in combination therewith a stalk-feeding belt, stalk shredding or slitting cutters, stalk feeding and flattening rolls interposed between said belt and cutters, strand receiving and carrying devices, a strand-assembling cover, and a strand-cutter.

17. In a machine of the character specified, a frame and in combination therewith a pair of shredding or slitting cutter-rolls, a pair of flattening-rolls, one or more pairs of feed-rolls, and a common support for one roll of each pair pivoted at one end and yieldingly retained at the other, whereby said rolls may be provided with a yielding movement with respect to their companion rolls and also with a varying pressure decreasing from the cutter-rolls to the feed-rolls.

18. In a machine of the character specified, a frame and in combination therewith a device having a plurality of separated, open, stalk-receiving ways into which the stalks are adapted to be laid or deposited sidewise and fed lengthwise, flattening means beyond said ways, and slitting-cutters beyond the flattening means for slitting the flattened stalks into long, narrow strands.

19. In a machine of the character specified, a frame and in combination therewith a device having a plurality of separated, stalk-receiving ways, in which the stalks are adapted to be laid or deposited and fed endwise, means beyond said ways for gradually flattening said stalks, and beyond said flattening means slitting-cutters for slitting the flattened stalks into long, narrow strands.

20. In a machine of the character specified, a frame, and in combination therewith a multiple stalk receiving and feeding device having a series of narrow stalk-receiving ways separated by walls, in which the stalks are adapted to be deposited or laid and fed endwise, rolls to assist in flattening the stalks, a yielding support for such rolls hinged from one end of the machine, and rotary cutters arranged to slit the flattened stalks fed lengthwise into long, narrow strands.

21. In a machine of the character specified, a frame and in combination therewith a multiple stalk receiving and feeding device having a series of narrow, stalk-receiving ways separated by walls, in which the stalks are adapted to be deposited or laid and fed endwise, adjustable rolls for flattening the stalks, a yielding support for said rolls hinged to one end of the machine, resilient means at the other end of the machine bearing on said support, whereby the pressure of the roll on said stalks may be varied, and a series of cutters arranged to slit the flattened stalks fed lengthwise into long, narrow strands.

22. In a machine of the character specified, a frame and in combination therewith a multiple stalk receiving and feeding device having a series of narrow, stalk-receiving ways separated by walls, in which the stalks are adapted to be deposited or laid and fed endwise, self-adjustable rolls for flattening the stalks, a series of cutters to slit the flattened stalks fed lengthwise into long, narrow strands, and a belt beyond said cutters to feed the strands therefrom.

23. In a machine of the character specified, a frame, sets of flattening-rolls adapted to feed and set to gradually flatten cornstalks, and slitting-cutters beyond said rolls for slitting the flattened stalks into long, narrow strands.

24. In a machine of the character specified, a frame and in combination therewith sets of flattening-rolls adapted to feed and set to gradually flatten cornstalks, means whereby the pressure of said flattening-rolls may be gradually increased, and slitting-cutters beyond said rolls for slitting the stalks into long, narrow strands.

25. In a machine of the character specified, a frame and in combination therewith a series of slitting-cutters, a pair of flattening-rolls arranged in front of said cutters, one or more pairs of feed-rolls, a common yielding support for said feed and flattening rolls pivoted to one end, and tensional means for retaining the other end of said support, whereby said rolls may be provided with a yielding movement with respect to their companion rolls and also with a varying pressure decreasing from the slitting-cutters.

CHARLES H. TRASK.

Witnesses:
F. F. RAYMOND, 2d,
SAUL SIPPERSTEIN.